United States Patent [19]
Cabezas et al.

[11] Patent Number: 5,612,961
[45] Date of Patent: Mar. 18, 1997

[54] METHOD AND SYSTEM FOR VERIFICATION OF THE BAUD RATE FOR AN ASYNCHRONOUS SERIAL DEVICE RESIDING WITHIN A DATA PROCESSING SYSTEM

[75] Inventors: Rafael G. Cabezas, Austin; Richard A. Foster, Round Rock, both of Tex.

[73] Assignee: International Business Machines Corporation, Armonk, N.Y.

[21] Appl. No.: 430,080

[22] Filed: Apr. 27, 1995

[51] Int. Cl.⁶ .................................................. G06F 11/00
[52] U.S. Cl. .................. 371/20.4; 371/20.5; 370/249; 375/224; 375/225
[58] Field of Search .................. 371/20.4, 20.5, 371/20.1; 324/160, 161, 76.11; 370/13, 15, 84, 91; 375/219–222, 224–225, 377, 368

[56] References Cited

U.S. PATENT DOCUMENTS

| | | | |
|---|---|---|---|
| 3,622,877 | 11/1971 | MacDavid | 375/222 |
| 4,271,514 | 6/1981 | Parras et al. | 371/20.5 |
| 4,564,933 | 1/1986 | Hirst | 370/15 |
| 5,359,609 | 10/1994 | Bonnifait et al. | 371/20.1 |

Primary Examiner—Robert W. Beausoliel, Jr.
Assistant Examiner—Phung My Chung
Attorney, Agent, or Firm—Richard A. Henkler

[57] ABSTRACT

A method of verifying the baud rate for communication of data by an Asynchronous serial device residing within a data processing system. The data processing system having a first Asynchronous serial device and a second Asynchronous serial device. The first and second serial devices are connected one to another for communication of data therebetween. The first and second serial devices are initialized with a common baud rate for transmission and reception of data, respectively. A test sequence pattern is created, and transmitted at the common baud rate from the first serial device to the second serial device. The second serial device transmits the received test sequence pattern back to the first serial device. The test sequence pattern is then verified as either valid or invalid.

6 Claims, 1 Drawing Sheet

METHOD AND SYSTEM FOR VERIFICATION OF THE BAUD RATE FOR AN ASYNCHRONOUS SERIAL DEVICE RESIDING WITHIN A DATA PROCESSING SYSTEM

BACKGROUND

1. Field of the Present Invention

The present invention generally relates to Asynchronous serial devices, and more specifically to a method of verifying the baud rate for communication of data by a serial device residing within a data processing system.

2. History of Related Art

Data processing systems, in general, use serial interface devices for communicating data to external devices such as keyboards. The rate at which the data is communicated to an external device is referred to as a Baud rate. Baud rate, as referred to hereinafter, refers to the unit of modulation rate corresponding to one unit interval per second.

Typically, the serial interface device of a data processing system has some variation of an internal clock and other circuitry for enforcing or maintaining a selected baud rate. Unfortunately, this internal clock or other circuitry may become unstable or defective for any number of reasons. When this occurs, the baud rate at which the serial interface device communicates information to an external device can become inaccurate or unstable. This results in an inability to communicate with the external device. Unfortunately, end users of the data processing system often lack access to expensive complex testing equipment for determining problems occurring within the serial interface device. Accordingly, the current methods employed for determining whether a serial interface device is defective must be simple and cost effective. One such method is the "wrap plug" test. A "wrap plug" test involves connecting the transmit and receive pins of the serial interface device to one another. This type of test, however, will only verify that accurate data is being transmitted by the serial interface device. Thus, the "wrap plug" test fails to detect a serial interface device which has an inaccurate clock or other circuitry for maintaining baud rate, since the data transmitted and the data received will be accurate. This often results in the end user spending endless hours and perhaps money to debug their data processing system for a problem which had not been revealed by the "wrap plug" test.

It would, therefore, be a distinct advantage to have a cost effective method and system for testing the accuracy of the baud rate for a serial interface device of a data processing system. The present invention provides such a method and system.

SUMMARY OF THE PRESENT INVENTION

The present invention is a method for verifying a selected baud rate for communication of data by an Asynchronous serial device residing within a data processing system.

In one aspect, the present invention is practiced as a method in a data processing system having a first Asynchronous serial device and a second Asynchronous serial device. The method verifying a selected baud rate for communication of data by the first serial device. The first and second serial devices are connected one to another for transmission and reception of data therebetween. A test sequence is created within the data processing system, and transmitted at a selected baud rate from the first serial device to the second serial device. After receiving the transmitted test sequence, the second serial device transmits the test sequence back to the first serial device. After the first serial device receives the test sequence, the test sequence is verified as either valid or invalid.

BRIEF DESCRIPTION OF THE DRAWINGS

The present invention will be better understood and its numerous advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

Figure 1:
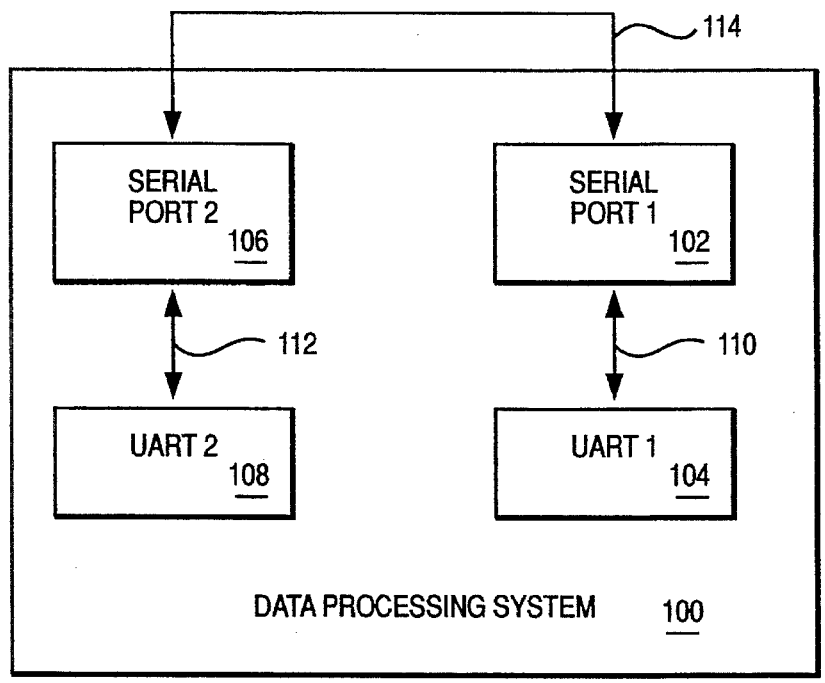
FIG. 1 is a schematic diagram illustrating a data processing system in which the present invention is practiced.

Reference now being made to FIG. 1, a schematic diagram is shown illustrating a data processing system 100 in which the present invention is practiced. The data processing system 100 includes a Universal Asynchronous Receive and Transmit serial device (UART) one 104, a serial port one 102, a UART two 106, and a serial port two 106. Serial port two 106 is connected to serial port one 102 via bi-directional connection 114. UART one 104 is connected to serial port one 102 via bi-lateral connection 110. UART two 106 is connected to serial port two 106 via bi-lateral connection 112.

The data processing system 100 may be, for example the RISC/6000 produced by International Business Machines (IBM), or a personal computer. UART one 104 and UART two 108 may be, for example, a 16C533 UART chip produced by National Semiconductors, or any other equivalent device. It should be noted, however, that UART one 104 and UART two 108 must be located on separate chips in order to be properly tested using the method of the present invention.

UART 104 may, during the course of its life, develop an inaccurate internal clock or other circuitry for maintaining an accurate baud rate. The present invention teaches a method and system for verifying that a selected baud rate of the UART 104 is used during transmission of data to external device such as external device 102.

Figure 2:
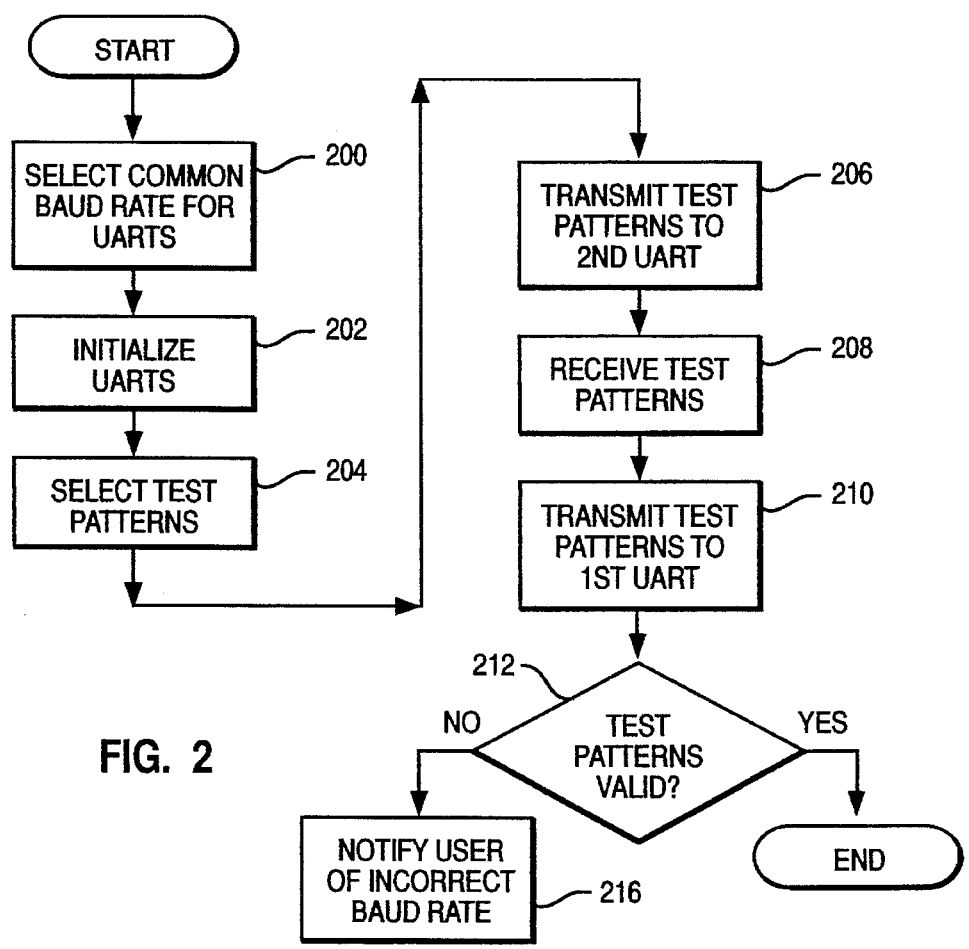
FIG. 2 is a flow chart illustrating the steps for verifying that a serial device residing within the data processing system of FIG. 1 is transmitting data at a selected baud rate according to the teachings of the present invention.

Reference now being made to FIG. 2, a flow chart is shown for illustrating the steps for verifying that the UART 104 of FIG. 1 is transmitting data at a selected baud rate according to the teachings of the present invention. The method begins at step 200 with selecting a common baud rate for communication of data for UART one 104 and UART two 108. In this particular example, it will be assumed that a common baud rate of 9600 is selected. The method then proceeds to step 202 where UART one 104 is initialized for transmission of data at 9600 baud, and UART two 108 is initialized for receiving data at 9600 baud. Thereafter, the method proceeds to step 204 where two different test patterns are chosen. In the preferred embodiment of the present invention the test patterns are bytes AA and 55 respectively. It should be noted, however, that any test pattern which tests all relevant conditions could be used in place of bytes AA and 55.

The method then proceeds to step 206 where the first and second test patterns are transmitted to UART two 108 via serial port one 102. Thereafter, at step 208, UART two 108 receives the test patterns via serial port two 106. The method then proceeds to step 210 where UART two 108 transmits the received test patterns, hereinafter referred to as processed test patterns, back to UART one 104. Thereafter, the processed first and second test patterns are compared to the original first and second test patterns, respectively, at step 212 to determine if the information contained therein matches, and to determine if the length for each of the processed first and second test patterns is correct. Information checking will provide a data integrity check, and length verification will insure that communication from serial port two 106 was not terminated prematurely. If, at step 212, it is determined that the information from either the first or second test patterns does not match, or the length of either the first or second test patterns is incorrect, then the baud rate of the UART 104 is incorrect, and the method proceeds to end at step 216 by notifying the user of the incorrect baud rate.

If, however, it is determined, at step 212, that the information does match and the length is correct, then the method ends at step 214 with the determination that the baud rate of UART one 104 is correct.

It is thus believed that the operation construction of the present invention will be apparent from the foregoing description. While the method and system shown and described has been characterized as being preferred, it will be readily apparent that various changes and/or modifications could be made therein without departing from the spirit and scope of the present invention as defined in the following claims.

What is claimed is:

1. In a computer having a first and second Asynchronous serial device, the first and second serial devices being independent of one another, a method of verifying a selected baud rate for communication of data by said first serial device, said method comprising the steps of:

connecting said first serial device to said second serial device for communication of data therebetween;

transmitting a test sequence pattern at a selected baud rate from said first serial device to said second serial device;

re-transmitting said received test sequence pattern from said second serial device to said first serial device at the same selected baud rate; and verifying that said test sequence pattern received by said first serial device is valid.

2. The method of claim 1 wherein said step of transmitting a test sequence pattern at a selected baud rate from said first serial device to said second serial device includes the steps of:

initializing said first device to transmit said test sequence pattern at said selected baud rate; and transmitting said test sequence pattern at said selected baud rate from said first serial device to said second serial device.

3. The method of claim 2 further comprising the step of:

initializing said second serial device to receive said test sequence pattern at said selected baud rate.

4. The method of claim 3 wherein said test sequence pattern includes a first test pattern and a second test pattern.

5. The method of claim 4 wherein said first test pattern is a byte in length and said second test pattern is a byte in length.

6. The method of claim 1 further comprising the step of:

creating said test sequence pattern.

* * * * *